us 011199561B2

United States Patent
Zou et al.

(10) Patent No.: US 11,199,561 B2
(45) Date of Patent: Dec. 14, 2021

(54) SYSTEM AND METHOD FOR STANDARDIZED EVALUATION OF ACTIVITY SEQUENCES

(71) Applicant: Robert Bosch GmbH, Stuttgart (DE)

(72) Inventors: Lincan Zou, San Jose, CA (US); Liu Ren, Cupertino, CA (US); Huan Song, Sunnyvale, CA (US); Cheng Zhang, Irvine, CA (US)

(73) Assignee: Robert Bosch GmbH, Stuttgart (DE)

( * ) Notice: Subject to any disclaimer, the term of this patent is extended or adjusted under 35 U.S.C. 154(b) by 431 days.

(21) Appl. No.: 16/236,790

(22) Filed: Dec. 31, 2018

(65) Prior Publication Data

US 2020/0209277 A1 Jul. 2, 2020

(51) Int. Cl.
| | | |
|---|---|---|
| *G01P 13/00* | (2006.01) | |
| *G06F 3/147* | (2006.01) | |
| *G06T 7/20* | (2017.01) | |

(52) U.S. Cl.
CPC ............ *G01P 13/00* (2013.01); *G06F 3/147* (2013.01); *G06T 7/20* (2013.01); *G09G 2320/103* (2013.01)

(58) Field of Classification Search
USPC ......................................................... 702/150
See application file for complete search history.

(56) References Cited

U.S. PATENT DOCUMENTS

| | | | | | |
|---|---|---|---|---|---|
| 5,400,087 | A | * | 3/1995 | Uramoto | H04N 5/145 348/699 |
| 5,467,133 | A | * | 11/1995 | Lee | H04N 19/51 375/240.12 |
| 6,157,677 | A | * | 12/2000 | Martens | G06T 7/20 375/240.16 |
| 9,830,516 | B1 | * | 11/2017 | Biswas | G06K 9/6259 |
| 10,594,940 | B1 | * | 3/2020 | Persiantsev | H04N 5/23267 |
| 10,609,440 | B1 | * | 3/2020 | Wu | H04N 19/65 |
| 2014/0055610 | A1 | * | 2/2014 | Ko | G06T 7/11 348/143 |
| 2015/0254330 | A1 | * | 9/2015 | Chan | G06F 16/219 707/613 |
| 2017/0143240 | A1 | * | 5/2017 | Stone | A61B 5/1113 |
| 2017/0169574 | A1 | * | 6/2017 | Xie | G06T 7/254 |

(Continued)

OTHER PUBLICATIONS

ProGlove Smart, Wearable Barcode Scanners, retrieved from https://www.proglove.com/ on Jul. 23, 2019.

(Continued)

*Primary Examiner* — Paul D Lee

(74) *Attorney, Agent, or Firm* — Brooks Kushman P.C.

(57) ABSTRACT

Motion windows are generated from a query activity sequence. For each of the motion windows in the query activity sequence, a corresponding motion window in the reference activity sequence is found. One or more difference calculations are performed between the motion windows of the query activity sequence and the corresponding motion windows in the reference activity sequence based on at least one criterion associated with physical meaning. Abnormality of the motion windows is determined based on the one or more difference calculations. A standardized evaluation result of the query activity sequence is output based on the detected abnormal motion windows in the query activity sequence.

18 Claims, 4 Drawing Sheets

(56) References Cited

U.S. PATENT DOCUMENTS

| | | | |
|---|---|---|---|
| 2018/0262866 A1* | 9/2018 | Haverinen | H04B 17/12 |
| 2019/0138676 A1* | 5/2019 | Akella | G06K 9/3233 |
| 2020/0193151 A1* | 6/2020 | Wnuk | B25J 9/1697 |

OTHER PUBLICATIONS

Dupont, Marc. Glove-based gesture recognition for real-time outdoors robot control. University of Southern Brittany, Lorient, France. Submitted to HAL archives-ouvertes Sep. 26, 2017.

Kim, Yeonho et al. Interactive Dance Performance Evaluation using Timing and Accuracy Similarity. Pohang University of Science and Technology, Pohang, South Korea. SIGGRAPH 2018, 45th International Conference & Exhibition on Computer Graphics and Interactive Techniques, Vancouver, BC, Canada, Aug. 12-16, 2016.

* cited by examiner

SYSTEM AND METHOD FOR STANDARDIZED EVALUATION OF ACTIVITY SEQUENCES

TECHNICAL FIELD

The present disclosure relates to systems and methods for standardized evaluation of activity sequences by using criteria associated with physical meaning.

BACKGROUND

Aspects of human movement can have a large impact on, for example, the way a tool is designed, the way a workspace is laid out, or the way a task is performed. Understanding how the human body can move and interact with objects and the environment can result in tools that are more ergonomic, workspaces that are more efficient to navigate, and tasks that more intuitive to perform. The range of possible human motions and gestures is vast, however, and simple tasks, such as lifting a cup, pointing in a direction, or turning a screw, often result from a complex set of biomechanical interactions. This relation of simple result from complex movement can make human motions and gestures extremely difficult to quantify or understand in a meaningful or practical way.

SUMMARY

In one or more illustrative examples, a system for detecting abnormal motions in activity sequences includes a display device, a memory configured to store a motion analysis application and motion capture data including a reference activity sequence and a query activity sequence; and a processor, operatively connected to the memory and the display device. The processor is configured to generate motion windows from the query activity sequence; for each of the motion windows in the query activity sequence, find a corresponding motion window in the reference activity sequence; perform one or more difference calculations between the motion windows of the query activity sequence and the corresponding motion windows in the reference activity sequence based on at least one criterion associated with physical meaning; determine abnormality of the motion windows according to the one or more difference calculations; and output, to the display device, a standardized evaluation result of the query activity sequence indicative of a measure of abnormality of the motion windows in the query activity sequence.

In one or more illustrative examples, a method for detecting abnormal motions in activity sequences includes generating motion windows from a query activity sequence; for each of the motion windows in the query activity sequence, finding a corresponding motion window in a reference activity sequence; performing one or more difference calculations between the motion windows of the query activity sequence and the corresponding motion windows in the reference activity sequence based on at least one criterion associated with physical meaning; determining abnormality of the motion windows according to the one or more difference calculations; and outputting a standardized evaluation result of the query activity sequence indicative of a measure of abnormality of the motion windows in the query activity sequence.

In one or more illustrative examples, a non-transitory computer readable medium includes instructions of a motion analysis application that, when executed by one or more processors, cause the one or more processors to generate motion windows from a query activity sequence; for each of the motion windows in the query activity sequence, find a corresponding motion window in a reference activity sequence; perform a plurality of difference calculations between the motion windows of the query activity sequence and the corresponding motion windows in the reference activity sequence based on multiple criteria associated with physical meaning, the difference calculations including an orientation difference calculation and a motion time difference calculation; perform a fusion of the plurality of difference calculations to determine abnormality of the motion windows; and output a standardized evaluation result of the query activity sequence indicative of a measure of abnormality of the motion windows in the query activity sequence, the standardized evaluation results including indications of motion windows identified as having abnormality.

DETAILED DESCRIPTION

Figure 1:
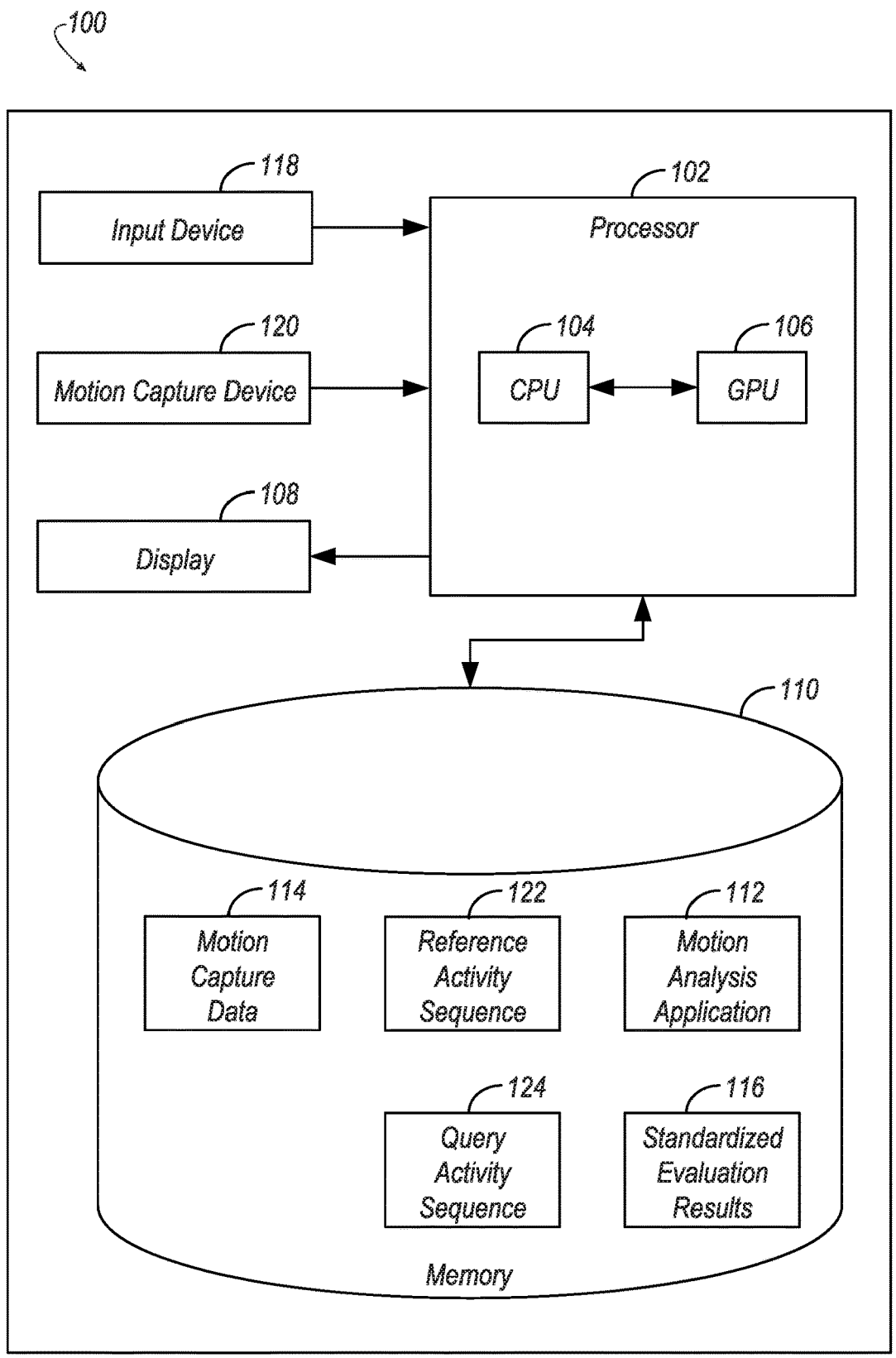
FIG. 1 illustrates an example system for performing a standardized evaluation of activity sequences according to this disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Understanding human activities based on inertial measurement units (IMUs) sensing data is an important, yet challenging, problem in industry. As an essential topic towards activity understanding, in many scenarios it is necessary to evaluate the standardization level of human activities. For example, inside manufactories, clearly understanding and evaluating the assembly actions of the operators can lead to improved product quality management. However, manual inspection to perform such evaluations is labor-intensive and it is thus necessary to develop a solution to evaluate the standardization level automatically. Some systems may record a standardized operation beforehand and then calculate a difference between each query activity sequence and the reference. Such approaches only suggest an abstract value as the overall difference between the two activities. Furthermore, to give meaning to the result, it is required for the value to be mapped to a standardization level based on human input each time according to the running scenario.

This disclosure proposes an approach to evaluate the standardization level of human physical activities using the time-series data from IMUs. The approach compares the query activity sequence with a given reference activity sequence, and fuses the evaluation results considering multiple characteristics of the physical motions. As compared to other systems, which evaluate activities as a whole and return a single number as the standardization level, the proposed approach detects abnormal motions in the activity sequence, in order to provide a local and fine-grained evaluation result. Another significant advantage of the approach is that the thresholding variables may be associated with physical meaning and can be generically defined for a wide range of activities, whereas in previous approaches the parameters are manually selected for each case.

FIG. 1 is a schematic diagram of an exemplary embodiment of a system 100 for performing a standardized evaluation of activity sequences. The system 100 may quantitatively compute an accuracy, e.g., a deviation from a prescribed motion or gesture and deviation from a target time period for completion, of a movement. The system 100 includes a processor 102 that is operatively connected to a memory 110, input device 118, motion capture device 120, and a display device 108. As is described in more detail below, during operation, the system 100 (i) receives motion capture data 114 including a reference activity sequence and a query activity sequence, e.g., from the memory 110, input device 118, or another source, (ii) processes the query activity sequence per motion window to compare to the reference activity sequence, (iii) performs a plurality of analyses and a data fusion of the analyses to determine abnormality of the motion window, and (iv) generates standardized evaluation results 116 of the computation that identifies abnormal motion windows and a standardized evaluation of the query activity sequence.

In the system 100, the processor 102 includes one or more integrated circuits that implement the functionality of a central processing unit (CPU) 104 and graphics processing unit (GPU) 106. In some examples, the processor 102 is a system on a chip (SoC) that integrates the functionality of the CPU 104 and GPU 106, and optionally other components including, for example, the memory 110, a network device, and a positioning system, into a single integrated device. In other examples the CPU 104 and GPU 106 are connected to each other via a peripheral connection device such as PCI express or another suitable peripheral data connection. In one example, the CPU 104 is a commercially available central processing device that implements an instruction set such as one of the x86, ARM, Power, or MIPS instruction set families.

The GPU 106 may include hardware and software for display of at least two-dimensional (2D) and optionally three-dimensional (3D) graphics to a display device 108. The display device 108 may include an electronic display screen, projector, printer, or any other suitable device that reproduces a graphical display. In some examples, processor 102 executes software programs including drivers and other software instructions using the hardware functionality in the GPU 106 to accelerate generation and display of the graphical depictions of models of human movement and visualizations of quantitative computations that are described herein During operation, the CPU 104 and GPU 106 execute stored program instructions that are retrieved from the memory 110. The stored program instructions include software that control the operation of the CPU 104 and the GPU 106 to perform the operations described herein.

While FIG. 1 depicts the processor 102 as including both the CPU 104 and GPU 106, alternative embodiments may omit the GPU 106, as for example the processor 102 may be of a server that generates output visualization data using only a CPU 104 and transmits the output visualization data to a remote client computing device that uses a GPU 106 and a display device 108 to display the data. Additionally, alternative embodiments of the processor 102 can include microcontrollers, application specific integrated circuits (ASICs), field programmable gate arrays (FPGAs), digital signal processors (DSPs), or any other suitable digital logic devices in addition to or as replacements of the CPU 104 and GPU 106.

In the system 100, the memory 110 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data, including a motion analysis application 112, motion capture data 114, and standardized evaluation results 116, during operation of the system 100. In some embodiments the CPU 104 and the GPU 106 each have access to separate RAM devices (e.g., a variant of DDR SDRAM for the CPU 104 and a variant of GDDR, HBM, or other RAM for the GPU 106) while in other embodiments the CPU 104 and GPU 106 access a shared memory device. The memory 110 may store the motion capture data 114, motion analysis application 112, and standardized evaluation results 116 for maintenance and retrieval.

The input device 118 may include any of various devices that enable the system 100 to receive the motion capture data 114, motion analysis application 112, and standardized evaluation results 116. Examples of suitable input devices include human interface inputs such as keyboards, mice, touchscreens, voice input devices, and the like, as well. In some examples the system 100 implements the input device 118 as a network adapter or peripheral interconnection device that receives data from another computer or external data storage device, which can be useful for receiving large sets of motion capture data 114 in an efficient manner.

The display device 108 may include an electronic display screen, projector, printer, or any other suitable device that reproduces a graphical display of the standardized evaluation results 116 that the system 100 generates based on the motion capture data 114.

The motion analysis application 112 includes instructions that, when executed by the processor 102 of the system 100, cause the system 100 to perform the processes and operations described herein. These processes and operations include to receive motion capture data 114 including a reference activity sequence and a query activity sequence, e.g., from the memory 110, input device 118, or another source, (ii) process the query activity sequence per motion window to compare to the reference activity sequence, (iii) perform a plurality of analyses and a data fusion of the analyses to determine abnormality of the motion window, and (iv) generate standardized evaluation results 116 of the computation that identifies abnormal motion windows and a standardized evaluation of the query activity sequence.

The motion capture data 114 refers to a plurality of records representative of the locations of at least one tracked item or portion of the item over time. For example, the motion capture data 114 may include one or more of: records of positions of a reference point on a body part over time or at set time intervals, sensor data taken over time, a video stream or a video stream that has been processed using a computer-vision technique, data indicative of the operating state of a machine over time, etc. In some cases, the motion capture data 114 may include data representative of more than one continuous movement. For instance, the motion capture data 114 may include a combination of a plurality of combined motion capture data 114 sets.

A motion capture device 120 is a device configured to generate motion capture data 114. Motion capture devices 120 may include, as some non-limiting examples: cameras, visual sensors, infra-red sensors, ultrasonic sensors, accelerometers, pressure sensors, or the like. One non-limiting example of a motion capture device 120 is one or a pair of digital gloves that a user wears while performing cyclical motions. The digital gloves may include sensors that capture the motions of the user to generate the motion capture data 114 that are stored in the memory 110.

A movement is an action performed by an operator. A reference movement refers to a baseline or canonical version of the movement. The reference movement may be used as a standard of comparison for other movements, to allow for identification of how close the other movements are to the reference movement.

The motion capture data 114 may be generally classified into one of two categories for the purpose of computing the accuracy of a human motion: a reference activity sequence 122 that includes data representative of the reference or baseline movement, and a query activity sequence 124 that includes data representative of the test movement, i.e., a movement to be compared and quantitatively evaluated for accuracy relative to the baseline movement.

The reference activity sequence 122 may include motion capture data 114 received from the motion capture device 120. The data may also include processed movement data, such as, for example, frame, step, cycle, and time information gleaned from the raw movement data. In one example, the reference movement is represented as a reference activity sequence 122 having an ordered set of frames that each includes motion capture data 114 corresponding to a respective interval of time of the reference movement.

The query activity sequence 124 may also include motion capture data 114 received from the motion capture device 120. In some examples, a movement or movements in the motion capture data 114 includes a label or labels classifying the movements as either reference movements or test movements. The motion analysis application 112 may be programmed is configured to receive instruction for classifying a movement or movements as reference movements or test movements, such as from a user via the input device 118 or from another source.

The motion analysis application 112 may be programmed to separate motion capture data 114 into individual movements. In some examples, the motion analysis application 112 computes different possible separations of the motion capture data 114 into individual movements and selects a separation based on accuracies computed by the motion analysis application 112.

The motion analysis application 112 may also be programmed to separate a received movement into frames, whereby a "frame" corresponds to a discrete interval of time. In other words, each frame of a movement includes a portion of the motion capture data 114 corresponding to a portion of the movement occurring during a respective interval of the timeline for that movement. In some examples, the duration for the interval corresponding to an individual frame is preset. In some examples, the duration for the interval corresponding to an individual frame is set based on an instruction received from, for example, the user via the input device 118 or another source. In some examples, the duration for the interval corresponding to an individual frame is set with reference to one or more characteristics of the motion capture data 114. For example, in some embodiments, the duration for the interval corresponding to an individual frame is set with reference to one or more of a duration of a reference movement, a total travel distance for the movement, a number of individual motions or gestures within the movement, a speed of the movement, etc. Generally, the same interval for the duration of frames is used for both a reference movement and for test movements to be evaluated relative to the reference movement.

In some instances, motion capture data 114 may be received as a file of stored motion capture data from a data storage device. In such instances, the motion analysis application 112 may separate the movement or movements in the motion capture data 114 into frames for further processing.

The motion analysis application 112 may also map frames of the test movement to corresponding frames of the reference movement. In some examples, the test movement and reference movement are synchronized so that frames of the test movement are mapped to frames of the reference movement that correspond temporally, and in some embodiments, the test movement and the reference movement are aligned in terms of gestures and motions within the movement, such that frames of the test movement are mapped to frames of the reference movement that correspond with regard to the sequence of motions and/or gestures performed in the movement.

The motion analysis application 112 may further compute an accuracy of the test movement or test movements relative to the reference movement. Based on the analysis, the motion analysis application 112 may generate the standardized evaluation results 116. The standardized evaluation results 116 may include a standardized level score indicative of an objective amount of difference between the test movements and the reference movement. The standardized evaluation results 116 may further include information indicative of the abnormal actions within the test movements as compared to the reference movement. Further aspects of generation of the standardized evaluation results 116 are described in detail below.

While the illustrated system 100 is shown using a single computing device that incorporates the display device 108, other example systems 100 may include multiple computing devices. As one example, the processor 102 generates the standardized evaluation results 116 as one or more data files, and the processor 102 transmits the standardized evaluation results 116 to a remote computing device via a data network. The remote computing device then may display the output standardized evaluation results 116. In one nonlimiting example, the processor 102 is implemented in a server computing device that executes the motion analysis application 112 to implement a web server that transmits the standardized evaluation results 116 to a web browser in a remote client computing device via a data network. The client computing device implements a web browser or other suitable image display software to display the standardized evaluation results 116 received from the server using a display device 108 of the client computing device.

Figure 2:
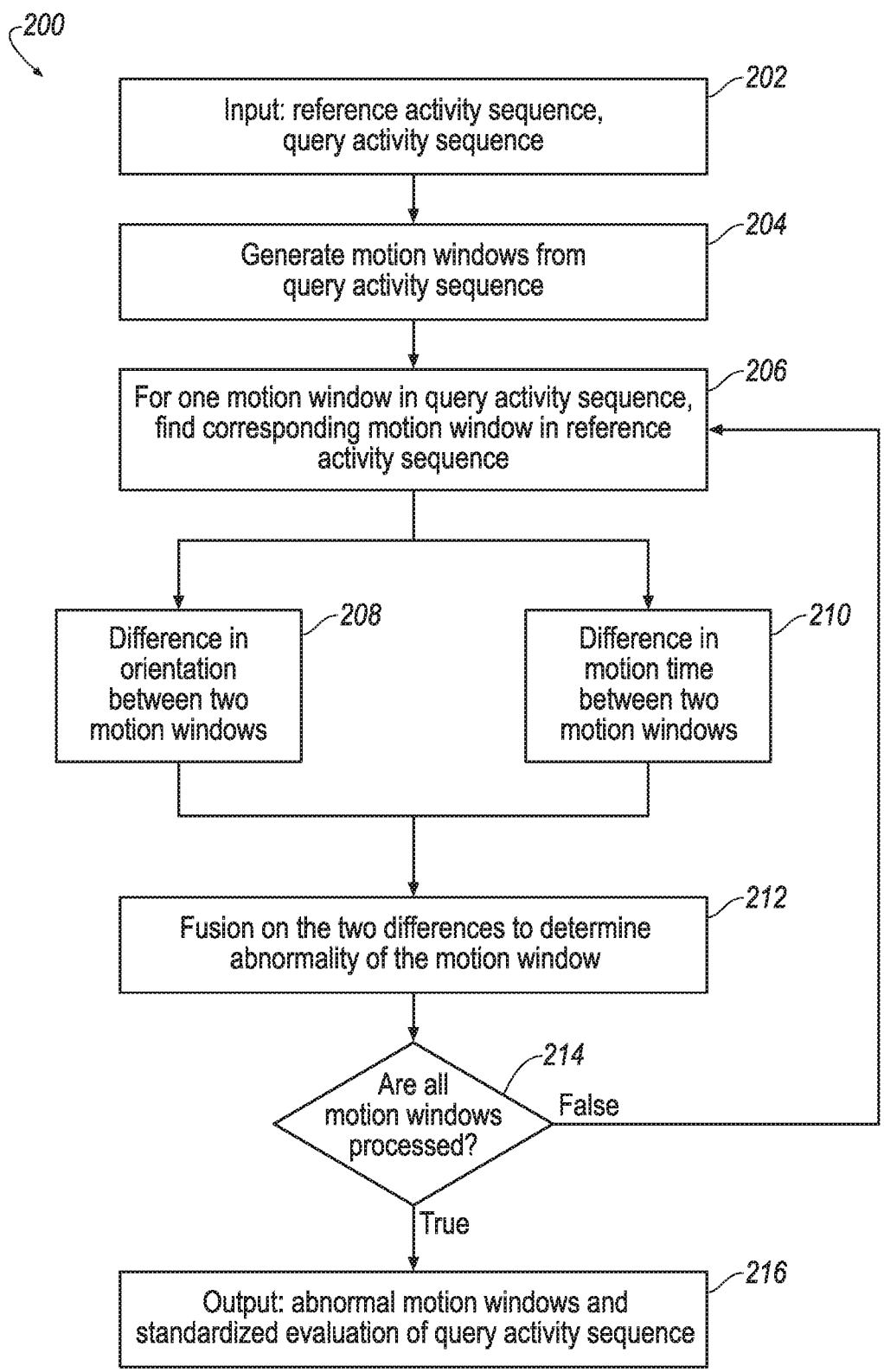
FIG. 2 illustrates an example process for evaluating a standardization level of query activity sequence compared with a reference activity sequence.

FIG. 2 illustrates an example process 200 for evaluating a standardization level of query activity sequence 124 compared with a reference activity sequence 122. As used herein, a motion window is a time window with a motion defined in that time window. The motion windows may be generated from the query activity sequence 124. Then, for each iteration, the motion window in query activity sequence 124 finds the corresponding motion window in reference activity sequence 122. With the motion windows identified, a difference between the two motion windows may be calculated based on one or more criteria. In one illustrative implementation, the difference between two motion windows is calculated based on two criteria, namely orientation and motion time. The final abnormality of the motion window may be determined by fusing the results from the criteria. The iteration continues until all motion windows are processed. The standardization evaluation of the query activity sequence is calculated based on the detected abnormal motion windows. The process 200 may be performed by the processor 102 of the system 100, as discussed in more detail below.

More specifically, at operation 202 the processor 102 receives the query activity sequence 124 and the reference activity sequence 122. In some examples, motion capture data 114 of the query activity sequence 124 and the reference activity sequence 122 may be received from a motion capture device 120. For instance, the motion capture device 120 may be a set of gloves (not shown) that, when worn by a user, is configured to transmit motion capture data 114 representative of the orientation of the user hands given by a palm-facing direction of each hand, a gesture for each hand given by joint angles for the joints of each hand, and a movement given by the linear acceleration in three dimensions for each hand. In some examples, the motion capture device 120 may be configured to connect with the system 100 via a wireless connection protocol such as, for example, BLUETOOTH, Wi-Fi, radio transmission, etc. In some examples, the motion capture device 120 may include tracking points which are trackable using an optical tracking system such as a camera or infra-red tracking system. In some examples, the motion capture device 120 may include one or more controls such as a button or switch configured to one or more of cause the system 100 to begin capturing motion capture data 114 transmitted by the motion capture device 120 and cause the system 100 to cease capturing the motion capture data 114. In some examples, the processor 102 may be configured to store the captured motion capture data 114 in a data file on a data storage device, such as in response to an instruction from the user received via the input device 118.

In some examples, the motion capture data 114 may be received as a data file from a data storage device. For instance, the processor 102 may be configured to receive user instruction via the input device 118 to load motion capture data 114 from a data file on a data storage device. In some examples, portions of motion capture data 114 are received from different sources. For instance, the reference activity sequence 122 may be loaded from a data file on a data storage device such as the memory 110, while the query activity sequence 124 may be captured using the motion capture device 120.

Regardless of source, the input to the process 200 is the query activity sequence 124 and the reference activity sequence 122. In one or more implementations, the data in the query activity sequence 124 contains orientation data from the IMU sensors. A quaternion is used to represent the orientation. Accordingly, the activity sequence 124 includes of a sequence of quaternions can be represented as shown in Equation (1):

$$q_t = w + ix + jy + kz \tag{1}$$

where t denotes time. The quaternion data representing the orientation information is the basis to determine the dissimilarity of the query activity sequence 124 compared to the reference activity sequence 122.

Figure 3:
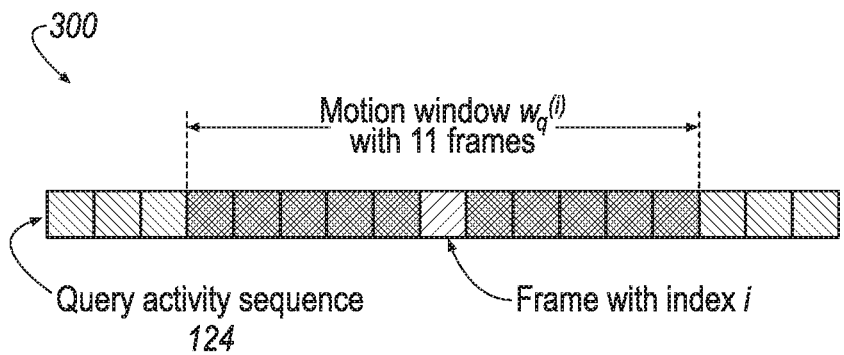
FIG. 3 illustrates an example representation of a motion window for a query activity sequence.

The processor 102 generates motion windows from the query activity sequence 124 at operation 204. FIG. 3 illustrates an example 300 representation of a motion window for a query activity sequence 124. The motion window may be referred to as $w_q^{(i)}$, denoting the window centered at index i of the query activity sequence. For each frame of the query activity sequence 124, the processor 102 generates a motion window from the time window centered at that frame with a duration configured by a parameter (e.g., an amount of time, a number of frames, etc.). The motion window may be clamped at the border of the query activity sequence 124 for frames at indexes that lack a duration in both directions of the extent of the configured parameter. Generally, if a query activity sequence 124 contains n frames, the processor 102 generates n motion windows from that query activity sequence 124.

As shown at operation 206, the processor 102 finds corresponding motion windows in the query activity sequence 124 and the reference activity sequence 122. Due to the high level of flexibility in movements of the query activity sequence 124 and the reference activity sequence 122, the query activity sequence 124 and the reference activity sequence 122 may be synchronized such that the frame-level matching can be achieved. Various algorithms may be used for this task, including Dynamic Time Warping (DTW) which is a process by which a warping path is determined to align desynchronized portions of the query activity sequence 124 and the reference activity sequence 122. The matching algorithm is usually based on the pair-wise distance between sequence frames, in this particular case, quaternions. In an example, the following quaternion distance $d(q_1, q_2)$ is used, as shown in Equation (2):

$$d(q_1, q_2) = 2 \cos^{-1}(|\langle q_1, q_2 \rangle|) \tag{2}$$

where $\langle q_1, q_2 \rangle$ denotes the quaternion inner product.

Given the set of pairwise distances, the processor 102 then identifies the optimal matching such that the overall distance is minimized. As a result, the processor 102 obtains the matching between a frame in the query activity sequence 124 and a frame in the reference activity sequence 122. Each frame of the motion window in query activity sequence 124 accordingly is associated with its corresponding frames in reference activity sequence 122. This set of corresponding frames defines the corresponding motion window in reference activity sequence 122, denoted as $w_r^{(f)}$.

Regarding the difference calculation, the difference between the two motion windows may be calculated based on one or more criteria. In one implementation, the difference between two motion windows is calculated based on two criteria, namely orientation and motion time.

Figure 4:
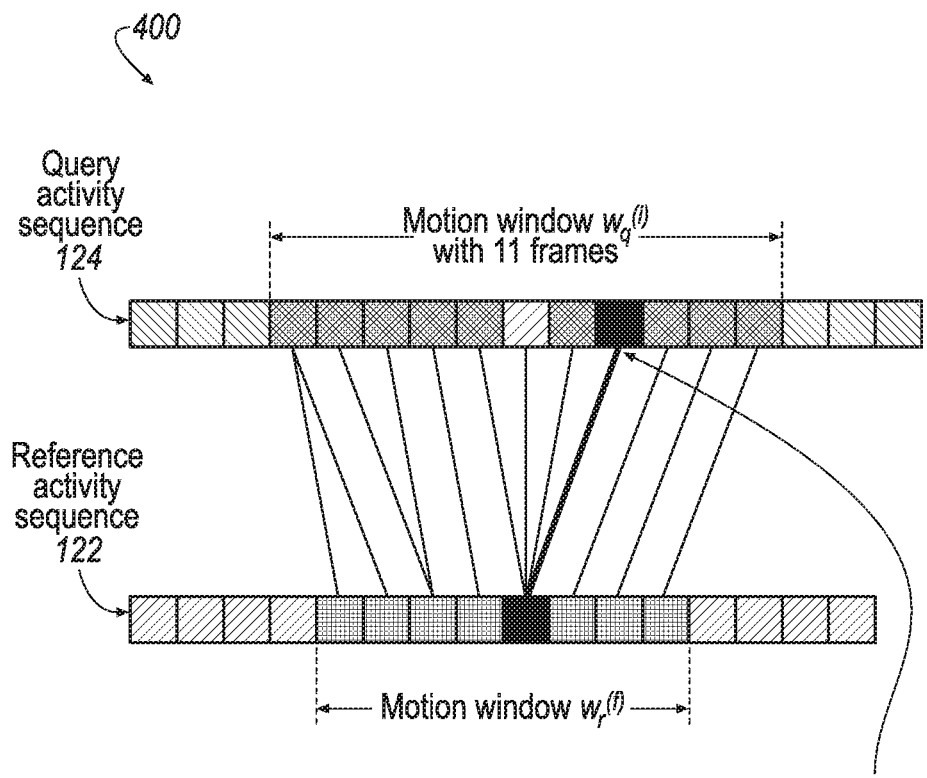
FIG. 4 illustrates an example calculation of the abnormality of motion windows based on orientation difference.

As shown at operation 208, the processor 102 computes the orientation difference. FIG. 4 illustrates an example 400 calculation of the abnormality of motion windows based on orientation difference. The orientation difference of two frames can be defined using the quaternion distance $d(q_1, q_2)$ defined above, where $q_1$, $q_2$ are the quaternion values contained in the frame data. Similarly, the orientation difference between two motion windows can be calculated based on the difference between all frames in the two motion windows. However, the movements can often exhibit large orientation variation, even for the same motion. To accommodate such variability, the median value of the pairwise distance is selected to represent the distance of the two motion windows. The motion window $w_q^{(i)}$ from query activity sequence is determined to be abnormal based on orientation difference if the median value is above a predefined threshold value.

Figure 5:
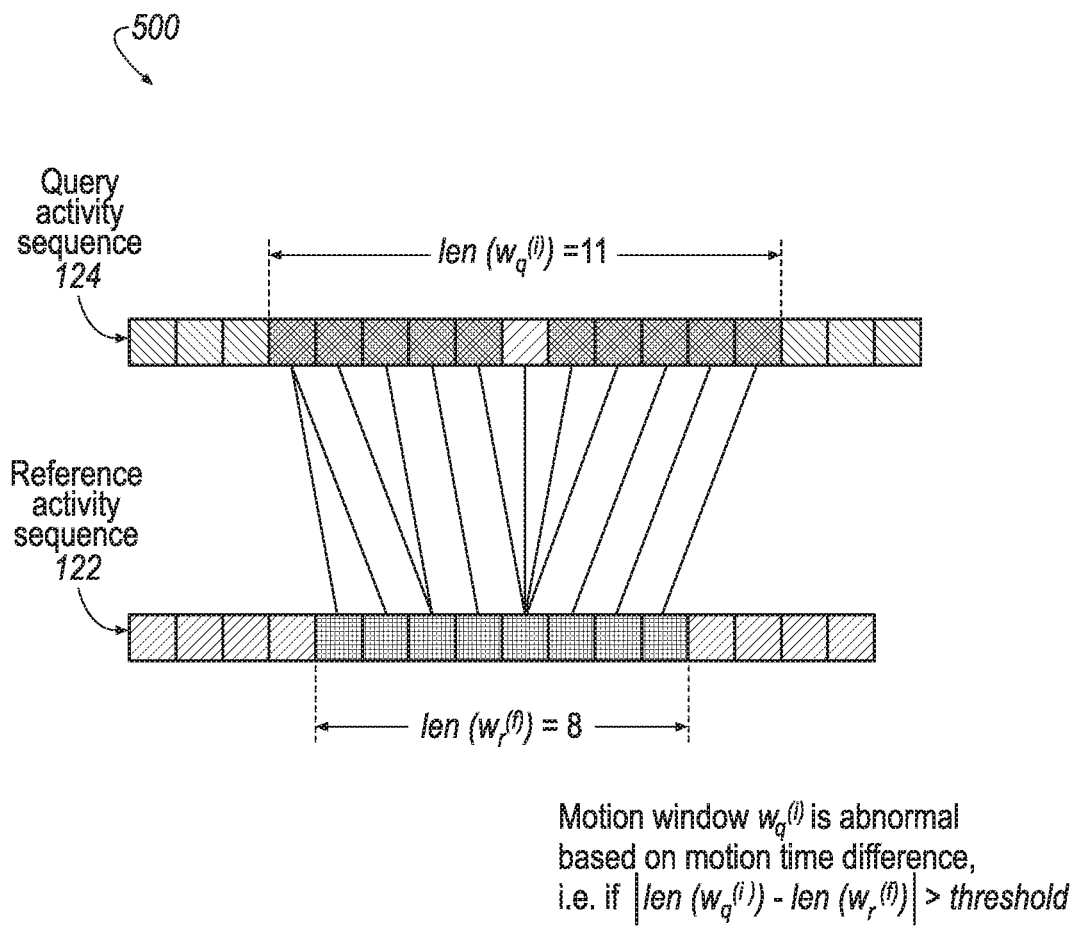
FIG. 5 illustrates an example calculation of the abnormality of motion window based on motion time difference.

As shown at operation 210, the processor 102 computes the motion time difference. FIG. 5 illustrates an example 500 calculation of the abnormality of motion window based on motion time difference. The duration of a motion window is another strong indicator of the standardization level. This invention considers the motion time difference of the two motion windows. The length of motion window is defined as the number of frames in the motion window. The motion window is considered abnormal if the length difference between the two motion windows, namely the one in query activity sequence and the counterpart in reference activity sequence, is larger than a certain threshold.

Fusion of the differences to determine abnormality of the motion window is performed at operation 212. In an example, the abnormality of the motion window is determined by fusing the results from multiple criteria. In some implementations, the difference between two motion windows is calculated based on two criteria, namely orientation and motion time continuing with the illustrated example. As one possibility, the motion window is identified as abnormal if any of the criterion is satisfied.

At operation 214, the processor 102 determines whether any additional motion windows require processing. If so, control returns to operation 206. If all motion windows have been processed, control passes to operation 216.

At 216, once all motion windows in the query activity sequence are evaluated, the processor 102 calculates the standardization evaluation results 116 of the sequence based on the detected abnormal motion windows in the sequence. One method is to give a standardization level score of the query activity sequence 124 by calculating the ratio of abnormal motion windows to total number of motion windows. The score may be calculated as shown in Equation (3):

$$s = 1.0 - \frac{\sum_{i=1}^{N_q} \text{abnormal}(w_q^{(i)})}{N_q} \quad (3)$$

where:

$$\text{abnormal}(w_q^{(i)}) = \begin{cases} 1 & \text{if } w_q^{(i)} \text{ is abnormal} \\ 0 & \text{otherwise} \end{cases}, \text{ and}$$

$N_q$ is the number of motion window in query activity sequence 124.

Accordingly, the disclosed approaches provide a solution to evaluate the standardization level of a query activity sequence 124 automatically by detecting abnormal motions inside the query activity sequence 124. This approach may be useful for any system that leverages IMU for human activity (including, but not limited to particular hand motions) anomaly detection and standardization evaluation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for detecting abnormal motions in activity sequences, comprising:
a display device;
a memory configured to store a motion analysis application and motion capture data including a reference activity sequence and a query activity sequence; and
a processor, operatively connected to the memory and the display device, and configured to execute the motion analysis application to
generate motion windows from the query activity sequence,
for each of the motion windows in the query activity sequence, find a corresponding motion window in the reference activity sequence,
perform a plurality of difference calculations between the motion windows of the query activity sequence and the corresponding motion windows in the reference activity sequence based on at least one criterion associated with physical meaning, the difference calculations including an orientation difference calculation and a motion difference calculation, perform a fusion of the plurality of difference calculations to determine abnormality of the motion windows, and output, to the display device, a standardized evaluation result of the query activity sequence indicative of a measure of abnormality of the motion windows in the query activity sequence.

2. The system of claim 1, wherein the standardized evaluation result indicates an abnormality for a motion window if any criterion of the plurality of difference calculations is satisfied.

3. The system of claim 1, wherein the processor is further configured to execute the motion analysis application to output, to the display device, any motion windows identified as having abnormality.

4. The system of claim 1, wherein the processor is further configured to execute the motion analysis application to:
calculate a ratio of abnormal motion windows to total number of motion windows; and
include the ratio in the standardized evaluation result.

5. The system of claim 1, wherein the reference activity sequence and the query activity sequence include quaternion values that represent orientation information, and the processor is further configured to execute the motion analysis application to
obtain orientation differences between the motion windows of the reference activity sequence and the query activity sequence according to quaternion distance; and
identify motion windows of the query activity sequence as having abnormality according to the orientation differences exceeding a predefined threshold value.

6. The system of claim 1, wherein the processor is further configured to execute the motion analysis application to:
identify motion time differences according to differences in length between motion windows of the reference activity sequence and the query activity sequence; and
identify motion windows of the query activity sequence as having abnormality according to the differences in length exceeding a predefined threshold value.

7. The system of claim 1, wherein the query activity sequence includes a plurality of frames, and the processor is further configured to execute the motion analysis application to, for each frame of the query activity sequence, generate a motion window as a time window centered at that frame with a duration of a predefined parameter.

8. A method for detecting abnormal motions in activity sequences comprising:
generating motion windows from a query activity sequence;
for each of the motion windows in the query activity sequence, finding a corresponding motion window in a reference activity sequence;
performing a plurality of difference calculations between the motion windows of the query activity sequence and the corresponding motion windows in the reference activity sequence based on at least one criterion associated with physical meaning, the difference calculations including an orientation difference calculation and a motion difference calculation;
performing a fusion of the plurality of difference calculations to determine abnormality of the motion windows; and
outputting a standardized evaluation result of the query activity sequence indicative of a measure of abnormality of the motion windows in the query activity sequence.

9. The method of claim 8, wherein the standardized evaluation result indicates an abnormality for a motion window if any criterion of the plurality of difference calculations is satisfied.

10. The method of claim 8, further comprising outputting, to a display device, any motion windows identified as having abnormality.

11. The method of claim 8, further comprising:
calculating a ratio of abnormal motion windows to total number of motion windows; and
including the ratio in the standardized evaluation result.

12. The method of claim 8, wherein the reference activity sequence and the query activity sequence include quaternion values that represent orientation information, further comprising:
obtaining orientation differences between the motion windows of the reference activity sequence and the query activity sequence according to quaternion distance; and
identifying motion windows of the query activity sequence as having abnormality according to the orientation differences exceeding a predefined threshold value.

13. The method of claim 8, further comprising:
identifying motion time differences according to differences in length between motion windows of the reference activity sequence and the query activity sequence; and
identifying motion windows of the query activity sequence as having abnormality according to the differences in length exceeding a predefined threshold value.

14. The method of claim 8, wherein the query activity sequence includes a plurality of frames, and further comprising, for each frame of the query activity sequence, generating a motion window as a time window centered at that frame with a duration of a predefined parameter.

15. A non-transitory computer readable medium comprising instructions of a motion analysis application that, when executed by one or more processors, cause the one or more processors to:
generate motion windows from a query activity sequence;
for each of the motion windows in the query activity sequence, find a corresponding motion window in a reference activity sequence;
perform a plurality of difference calculations between the motion windows of the query activity sequence and the corresponding motion windows in the reference activity sequence based on multiple criteria associated with physical meaning, the difference calculations including an orientation difference calculation and a motion difference calculation;
perform a fusion of the plurality of difference calculations to determine abnormality of the motion windows; and
output a standardized evaluation result of the query activity sequence indicative of a measure of abnormality of the motion windows in the query activity sequence, the standardized evaluation result including indications of motion windows identified as having abnormality.

16. The medium of claim 15, further comprising instructions of the motion analysis application that, when executed by one or more processors, cause the one or more processors to:
calculate a ratio of abnormal motion windows to total number of motion windows; and
include the ratio in the standardized evaluation result.

17. The medium of claim 15, wherein the reference activity sequence and the query activity sequence include quaternion values that represent orientation information, and further comprising instructions of the motion analysis application that, when executed by one or more processors, cause the one or more processors to:

obtain orientation differences between the motion windows of the reference activity sequence and the query activity sequence according to quaternion distance; and identify motion windows of the query activity sequence as having abnormality according to the orientation differences exceeding a predefined threshold value.

18. The medium of claim 15, further comprising instructions of the motion analysis application that, when executed by one or more processors, cause the one or more processors to:

identify motion time differences according to differences in length between motion windows of the reference activity sequence and the query activity sequence; and identify motion windows of the query activity sequence as having abnormality according to the differences in length exceeding a predefined threshold value.

\* \* \* \* \*